US012350695B2

(12) United States Patent
Miller et al.

(10) Patent No.: US 12,350,695 B2
(45) Date of Patent: Jul. 8, 2025

(54) PALLET COATING WASTE RECOVERY SYSTEM

(71) Applicant: AIR AND LIQUID SYSTEMS, LLC, Rochester Hills, MI (US)

(72) Inventors: James E. Miller, Birmingham, MI (US); Jonathan Douglas Hommes, Farmington Hills, MI (US); Karl Walby, Bloomfield Hills, MI (US); Gordon T. Urquhart, Birmingham, MI (US)

(73) Assignee: AIR AND LIQUID SYSTEMS, LLC, Rochester Hills, MI (US)

( * ) Notice: Subject to any disclaimer, the term of this patent is extended or adjusted under 35 U.S.C. 154(b) by 470 days.

(21) Appl. No.: 17/883,299

(22) Filed: Aug. 8, 2022

(65) Prior Publication Data

US 2023/0085131 A1    Mar. 16, 2023

Related U.S. Application Data

(60) Provisional application No. 63/244,553, filed on Sep. 15, 2021.

(51) Int. Cl.
| | |
|---|---|
| *B05B 14/45* | (2018.01) |
| *B01D 21/00* | (2006.01) |
| *B01D 21/24* | (2006.01) |
| *B01D 21/26* | (2006.01) |
| *B05B 14/46* | (2018.01) |
| *B05B 14/462* | (2018.01) |
| *B05B 14/465* | (2018.01) |

(52) U.S. Cl.
CPC .......... *B05B 14/45* (2018.02); *B01D 21/0012* (2013.01); *B01D 21/0018* (2013.01); *B01D 21/0084* (2013.01); *B01D 21/2438* (2013.01); *B01D 21/267* (2013.01); *B05B 14/462* (2018.02); *B05B 14/465* (2018.02)

(58) Field of Classification Search
USPC ................................. 118/326, 300, 602, 603
See application file for complete search history.

(56) References Cited

U.S. PATENT DOCUMENTS

| | | |
|---|---|---|
| 6,761,820 B2 | 7/2004 | Miller |
| 7,767,085 B2 | 8/2010 | Urquhart et al. |

(Continued)

OTHER PUBLICATIONS

Floating AutoWeir, https://www.airliquidsystems.com/wp-content/uploads/2019/08/AutoWeir_Floating_2019.pdf, 1 page. Accessed Aug. 29, 2023.

(Continued)

*Primary Examiner* — Yewebdar T Tadesse
(74) *Attorney, Agent, or Firm* — Husch Blackwell LLP (57) ABSTRACT

The present invention relates to a self-contained unit having a system for recovering polymer overspray from a pallet coating process. The self-contained unit includes a common enclosure having at least four walls, a ceiling and a floor. There is a collection tank located below the floor of the common enclosure and a roof platform is located above the ceiling of the common enclosure. Within the common enclosure is at least one spray booth having a waterfall wall with liquid flowing down a face of the waterfall wall to the collection tank. Mounted on the roof platform is a consolidation tank, hydrocyclone and pressure filter that are all part of the system for removing the polymer from the overspray mixture collected at the collection tank.

17 Claims, 13 Drawing Sheets

(56) References Cited

U.S. PATENT DOCUMENTS

| | | |
|---|---|---|
| 8,277,652 B2 | 10/2012 | Urquhart et al. |
| 10,525,380 B2 | 1/2020 | Miller et al. |
| 10,640,408 B2 | 5/2020 | Miller et al. |
| 10,780,374 B2 | 9/2020 | Miller et al. |
| 2014/0224360 A1 | 8/2014 | Miller et al. |

OTHER PUBLICATIONS

Palin Paint Sludge Consolidator Innovations Solutions, https://www.airliquidsystems.com/wp-content/uploads/2019/06/Palin-2019.pdf, 2 pages. Accessed Aug. 29, 2023.

Autoweir, https://www.airliquidsystems.com/autoweir/, 4 pages. Accessed Aug. 29, 2023.

Palin Consolidation System, https://www.youtube.com/watch?v=lpeK7oQ1VKg, 4 pages. Accessed Aug. 29, 2023.

Palin Paint Sludge Consolidator, https://www.airliquidsystems.com/palin-paint-sludge-consolidator/, 4 pages. Accessed Aug. 29, 2023.

PALLET COATING WASTE RECOVERY SYSTEM

FIELD OF THE INVENTION

The present invention relates to a system for filtering polyurea or polyurethane from a wet spray booth.

BACKGROUND OF THE INVENTION

In the field of pallet manufacturing, traditional wood pallets are assembled from wood pieces that are nailed together. Over time the pallets become rotten or are subject to breakage. More expensive polymer pallets have been developed however these types of pallets are typically significantly heavier than a traditional wood pallet. In order to achieve a desired lightweight pallet, which is protected from rotting and breaking, recent technology has been employed where wood pallets coated with a plastic to protect the wood. Coating a wood pallet is accomplished by spraying the plastic coating onto the pallet. However, spraying creates a significant amount of waste due to overspraying of the plastic material. It is therefore desirable to develop a system using a wet spray booth with a waterfall positioned behind the pallet that catches the overspray of plastic material.

There is also a need in industrial waste water purification systems to consolidate waste materials from other systems besides pallet coating systems. For example, waste materials are generated from a variety of other systems including paint systems, wash systems for treating or removing oils or waxes from products. Other systems created by Applicant utilize what is commercially referred to as a PALIN® consolidation device that is manufactured by Air and Liquid Systems LLC of Rochester Hills, Michigan. The PALIN® consolidation device utilizes a micro-aeration pump that injects micro-bubbles into the liquid contained in the tank to assist in separating solids from a waste water stream. However, depending on the type of waste material being collected by the system, the micro-aeration pump is subject to unwanted clogging and cavitation. It is therefore desirable to provide microbubbles in a consolidation device, but also eliminate the use of a micro-aeration pump. Also, in systems where a micro-aeration pump is used, the microbubbles are introduced with the waste water mixture inlet stream directly rather than in the tank itself. It is desirable to introduce the microbubbles in the tank, preferable at a location where the waste mixture is flowing in a vortex within the consolidation tank itself.

SUMMARY OF THE INVENTION

The present invention relates to a self-contained unit having a system for recovering polymer overspray from a pallet coating process. The self-contained unit includes a common enclosure having at least four wads a ceiling and a floor. A collection tank is located below the floor of the common enclosure and a roof platform is located above the ceiling, Within the common enclosure is at least one spray booth having a waterfall wall with liquid flowing down a face of the waterfall wall to the collection tank. The waterfall wall can have multiple walls depending on the direction polymer material is sprayed. There is a workpiece holder within the at least one spray booth for holding a workpiece and the waterfall wall is positioned on a first side of the workpiece holder. There is a spray applicator within the at least one spray booth for spraying a polymer onto a workpiece positioned on the workpiece holder. During the spraying of the polymer onto the workpiece an overspray of polymer from the spray applicator travels past the workpiece and contacts the liquid of the waterfall wall and is transferred to the collection tank through a drain in the floor.

The self-contained unit further includes a hydrocyclone connected to the roof platform above the common enclosure. The hydrocyclone is connected to a first outlet of the collection tank and the hydrocyclone separates a portion of the overspray mixture into a first solid rich mixture and liquid. The first solid rich mixture is removed from a first outlet and a second outlet is used to remove the liquid which is sent back to an inlet of the waterfall wall.

The self-contained unit further includes a consolidation tank connected to the roof platform above the common enclosure. The consolidation tank is connected to the second outlet of the collection tank and receives a portion of the overspray mixture. A portion of the polymer in the overspray mixture will float to the surface of the consolidation tank creating a second solid rich mixture that is removed from the consolidation tank, and a portion of the polymer in the over spray mixture will sink to the bottom of the consolidation tank, creating a third solid rich mixture that is removed from the consolidation tank. A cone bottom tank receives the first solid rich mixture, the second solid rich mixture and the third solid rich mixture, which are all combined to form a cone tank mixture. The cone tank mixture contains the polymer and the liquid, where the polymer is in concentration with the liquid. In the cone bottom tank, the polymer will sink to the bottom where is then removed through an outlet for further processing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring now to all the figures, a system 10 which includes a self-contained unit 11 for recovering waste from a pallet coating process where polyurea or polyurethane is sprayed on to a pallet in a wet spray booth. The system 10 provides for recovering polymer overspray from a collection tank 16. The polymer overspray includes what is generally referred to as polymer, however, in some embodiments the polymer is polyurea or polyurethane. However, it is within the scope of this invention for the polymer to be any type of polymer and can include other materials such as adhesive, paint, wax and organic compounds including oil. The self-contained unit 11 that contains all of the components of the system 10 on a single structure, which separates the pallet coating process from the surrounding environment. The self-contained unit 11 provides a common enclosure 13 for conducting a pallet coating process. The common enclosure 13 has four walls 108a, 108b, 108c, 108d a ceiling 110 and a floor 112 that separate the interior environment of the self-contained unit 11 from the surrounding environment. Above the ceiling 110 of the common enclosure 13 is a roof platform 114 used to mount various components for removing polymer, as described below. Below the floor 112 is a collection tank 16, that is also used to collect polymer overspray. The interior of the common enclosure 13 creates an application area where polymer coating material is applied to the pallets, while the polymer removal or recovery occurs outside of the common enclosure 13 but still on the self-contained unit 11 as described herein.

Within the interior of the self-contained unit 11 pallets are coated with polymer and waste material, in the form of polymer overspray, which is a mixture of liquid and solid or semi-solid polymer that is over-sprayed past the pallet, is separated and collected directly from different components of the self-contained unit 11. The surrounding environment can be a warehouse, outdoor lot or any desired location. The system 10 is modular and can be disassembled and reassembled at a different location. The system 10 includes spray booths 12a, 12b that are in the common enclosure 13, which has a floor drain edge 118a, 118b to a common collection tank 16 located below the floor 112 of the common enclosure 13 of the self-contained unit 11. In the present embodiment of the invention there are two spray booths, however, it is within the scope of this invention for there to be a greater or lesser number of spray booths depending on the size of the common housing unit 13 and a particular application.

Each of the spray booths 12a, 12b has a waterfall wall 14a, 14b with liquid flowing down a face of the waterfall wall 14a, 14b to the floor drain edge 118a, 118b of the collection tank 16. The type of liquid is typically water; however, it is within the scope of the invention for the liquid to be made of an organic solvent or aqueous solution.

Within the spray booth 12a, 12b is a workpiece holder 18a, 18b for holding a workpiece 20a, 20b, wherein the waterfall wall 14 is positioned on a first side of the workpiece holder 18a, 18b. The work piece holder 18a, 18b can be a turn table that is able to rotate the work piece 20a, 20b three-hundred-sixty degrees. In the present embodiment of the invention the work piece 20a, 20b is a pallet made of wood or polymer material that is coated with a polymer material. The polymer material can be virtually any type of material capable of being sprayed and includes but is not limited to polyurea or polyurethane. It is within the scope of this invention for the work piece 20a, 20b to be some other article that would benefit from spray polymer coating.

Each spray booth 12a, 12b further includes a spray applicator 24a, 24b for spraying a polymer onto the respective workpiece 20a, 20b positioned on the workpiece holder 18a, 18b. The spray applicator 24a, 24b in a preferred embodiment is a robotic arm with a nozzle, however, it is within the scope of the invention for the spray applicator 24a, 24b to be a manually operated spray gun that is held and manually operated by a person. An overspray 26a, 26b of polymer from the spray applicator 24a, 24b that travels past the workpiece 20a, 20b contacts the liquid of the waterfall wall 14a, 14b, wherein the overspray of polymer and the liquid form an overspray mixture 27 drains past the respective floor drain edge 118a, 118b and is collected in the collection tank 16.

Referring also to FIGS. 5-8 the details of the collection tank 16 are shown. As shown best in the schematic in FIG. 1, the collection tank 16 receives liquid from three sources, which from the overspray mixture 27. The overspray mixture in the collection tank 16 includes liquid from the waterfall wall 14a, 14b, liquid from a pressure filter 70 and liquid from a consolidation tank 48, all of which are described in greater detail below. The hydrocyclone 34, the consolidation tank 48 and the pressure filter 70 are all located on the roof platform 114. This separates the polymer reclamation process from the pallet coating process, which occurs within the common enclosure 13.

The collection tank 16 has a first outlet 28 and a second outlet 30. The first outlet 28 is connected to an autoweir 29 that has a hinged door positioned at the surface of the overspray mixture in the collection tank 16. The hinged door has a float that causes the hinged door to move vertically and track with the surface level of the overspray mixture 27 to remove concentrated polymer solids suspended in a mixture with the liquid. While the autoweir 29 shown is vertically stationary or manually adjusted vertically, it is within the scope of the invention for a floating weir to be used. An example of a floating weir is described in U.S. Pat. No. 10,525,380 B2 entitled "FLOATING CHOPPER SLUDGE WEIR" issued to Applicant Air and Liquid Systems, Inc. of Rochester Hills, MI; the entire contents of the application are hereby expressly incorporated by reference. The floating polymer material which is concentrated and mixed with liquid is collected by the autoweir 29 and the first outlet 28.

Figure 1:
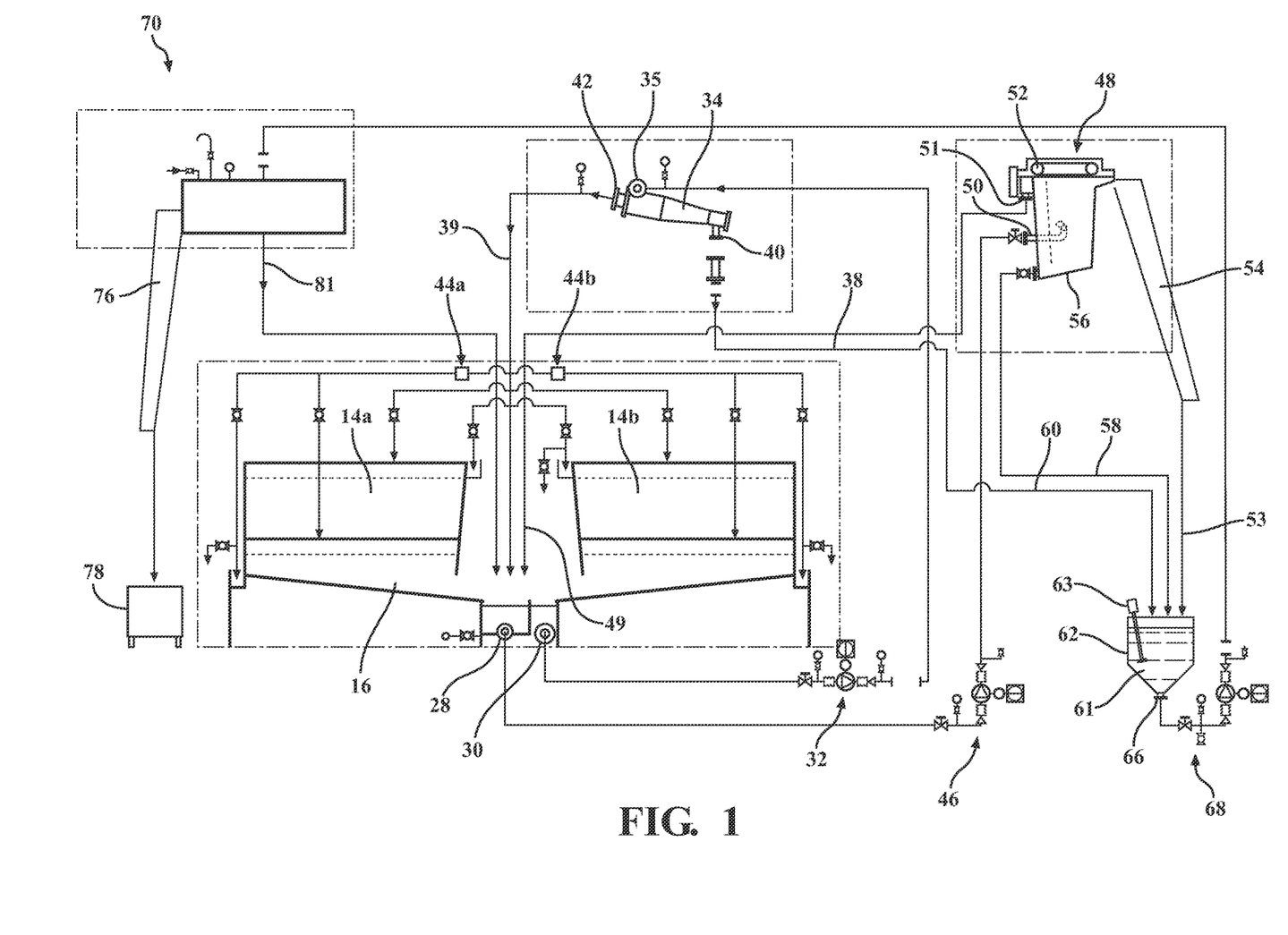
FIG. 1 is a liquid flow diagram of a system for recovering polymer overspray from a collection tank.
Figure 2:
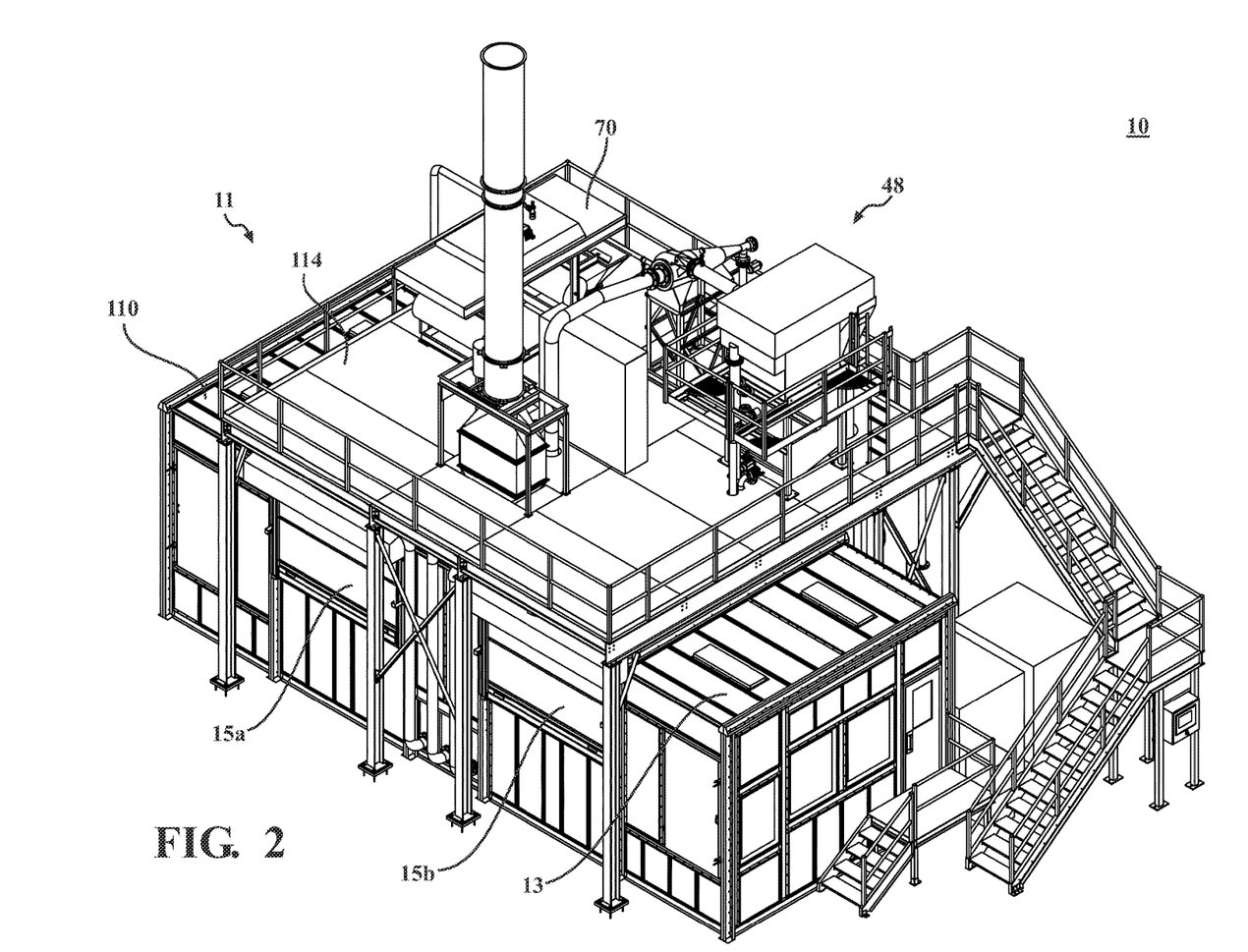
FIG. 2 is a front side perspective view of a self-contained unit for recovering waste from a pallet coating process.
Figure 3:
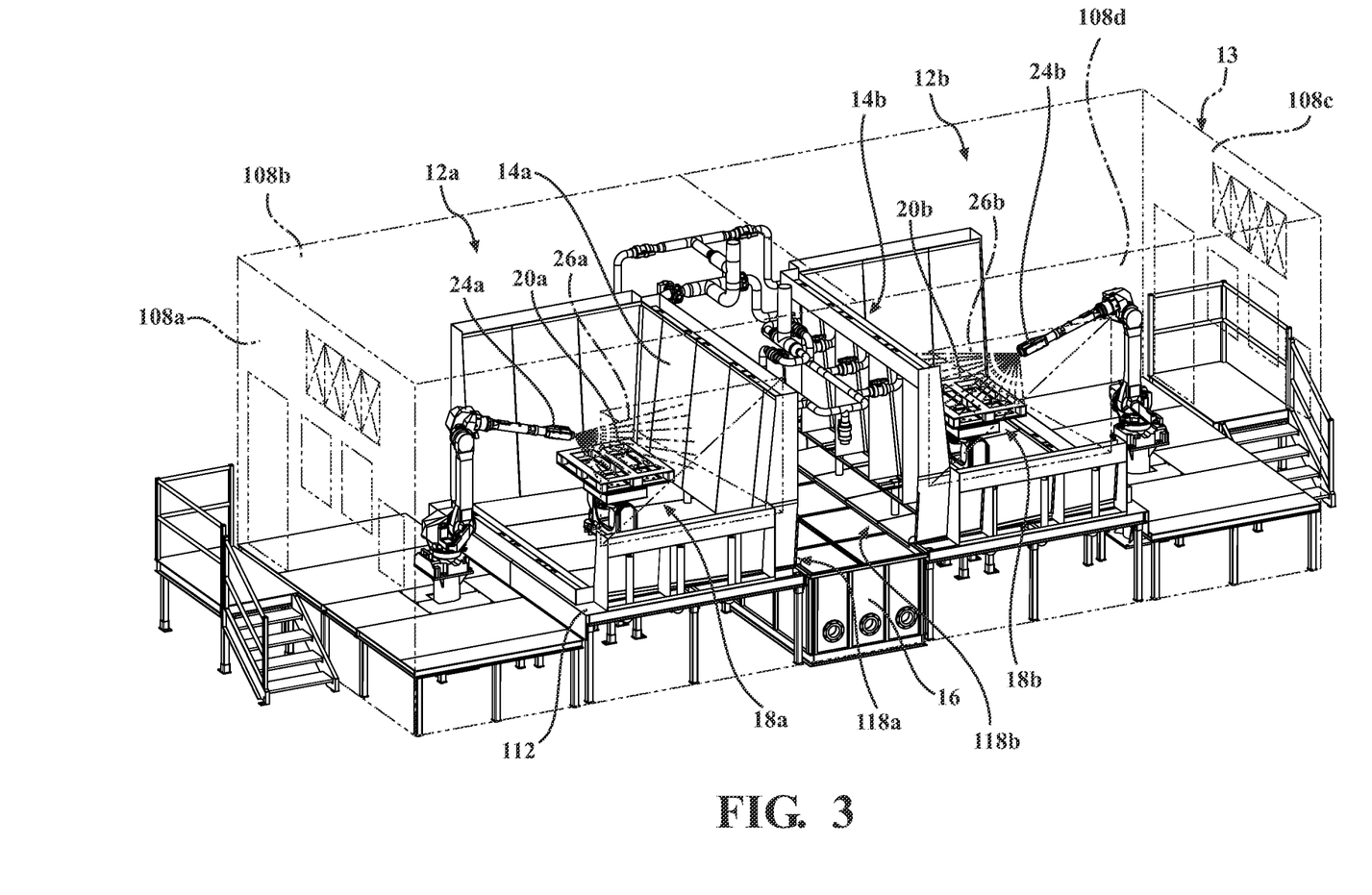
FIG. 3 is a phantom perspective view of portions of the self-contained unit for recovering waste from a pallet coating process.
Figure 9:
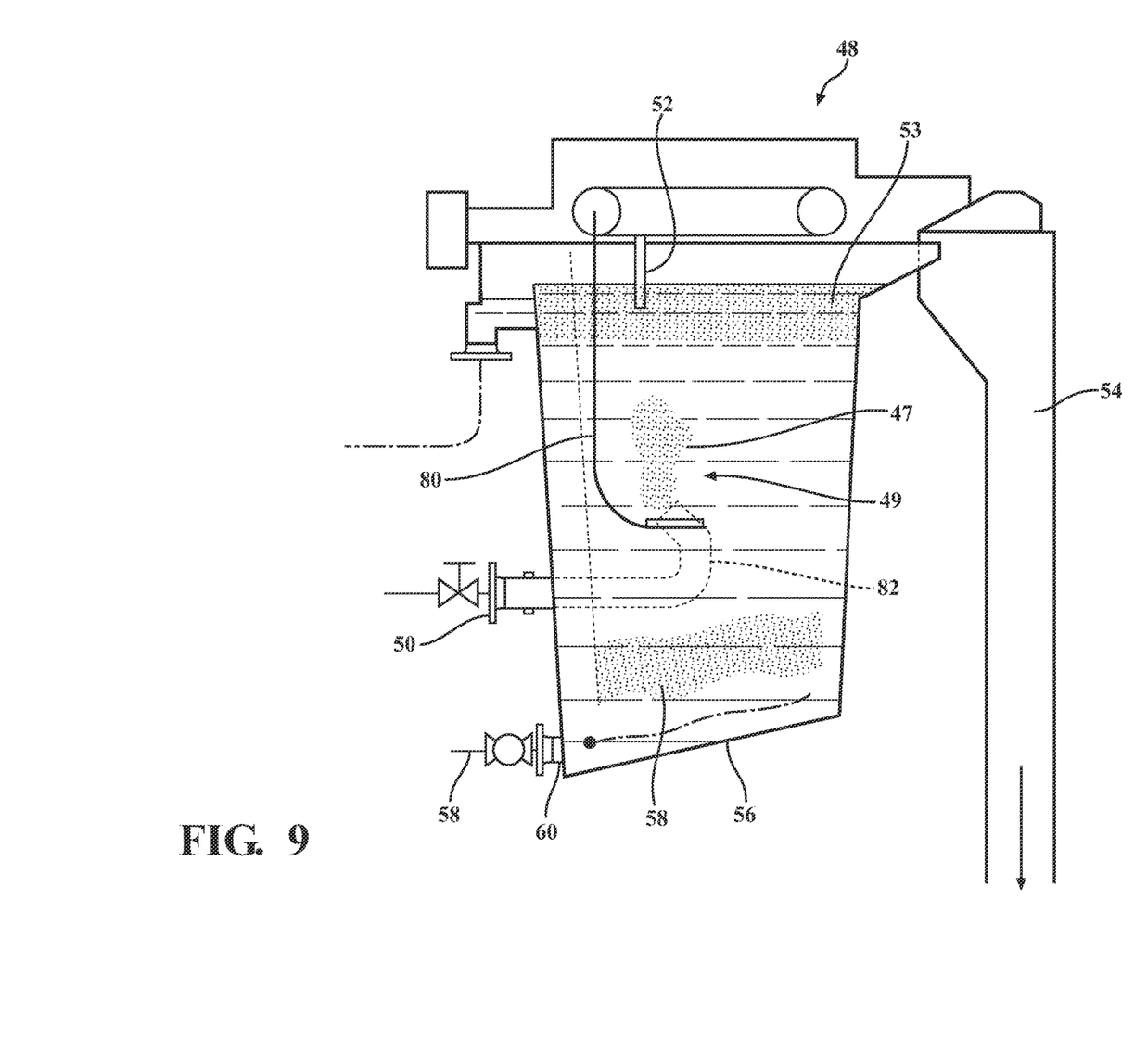
FIG. 9 is a side cross sectional schematic view of a consolidation tank.
Figure 16:
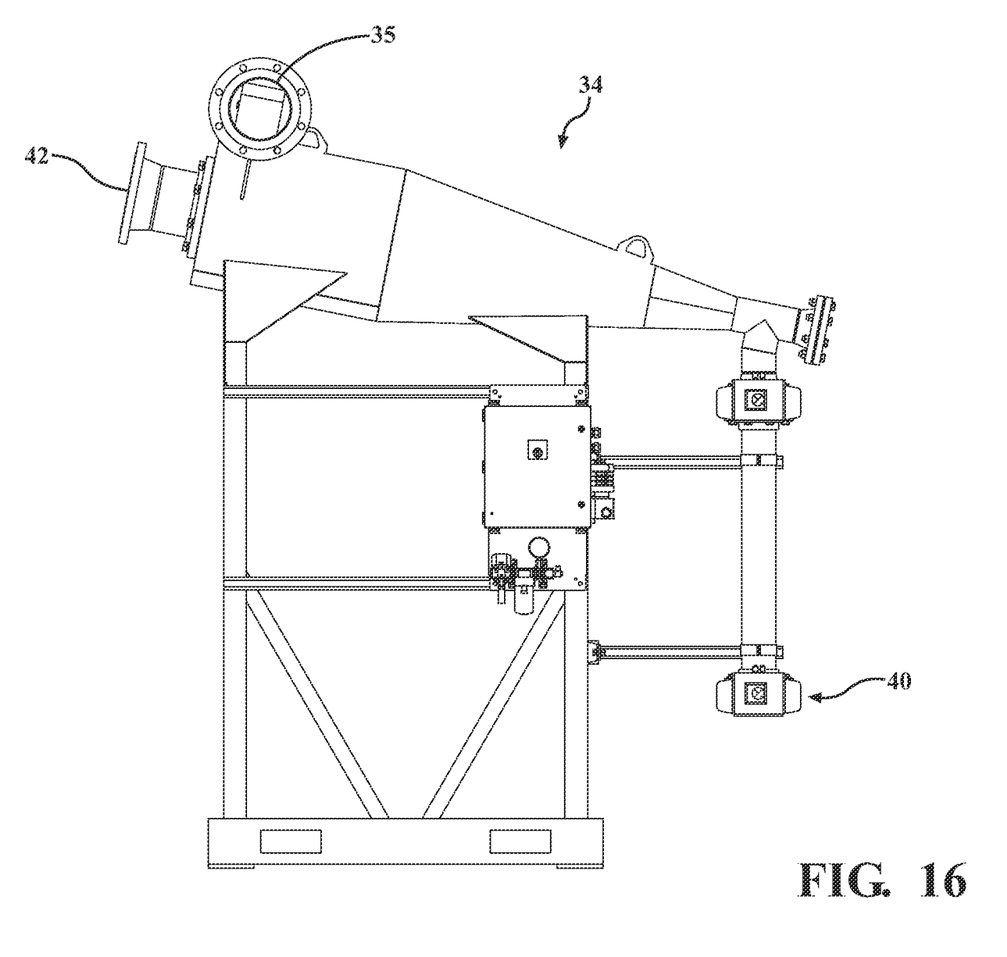
FIG. 16 is a side elevational view of the hydrocyclone.

Referring to FIGS. 1 and 16 a hydrocyclone pump 32 (shown in FIG. 1) is connected to the second outlet 30 of the collection tank 16 and pumps polymer material and liquid from the bottom of the collection tank 16 to an inlet 35 the hydrocyclone 34. The hydrocyclone pump 32 pressurizes the floating polymer and liquid collected from the bottom of the collection tank 16, which then enters the hydrocyclone 34. In the hydrocyclone 34 a vortex of liquid and polymer is formed, which mechanically separates the polymer particles so the polymer particles (with minor amounts of liquid) exit one side of the hydrocyclone and the liquid exits a second side as described below. The hydrocyclone 34 separates the liquid received from the collection tank 16 into a first solid rich mixture 38 which contains mostly solid polymer and a return liquid 39, which is the same liquid that flows across the waterfall walls 14a, 14b, The first solid rich mixture 38 is removed from a first outlet 40 of the hydrocyclone 34 and the return liquid 39 is removed from the second outlet 42. The volume of return liquid 39 from the hydrocyclone 34 can be large and as a result a portion that is sent back to inlets 44a, 44b of the waterfall wall 16a, 16b and another portion is sent back to the collection tank 16 through the port 104. Referring to FIGS. 1 and 9, the system 10 further includes a consolidation tank pump 46 connected to the first outlet 28 of the collection tank 16. The first outlet 28 is connected to the autoweir 29 and receives overspray mixture which has concentrated polymer material in liquid from the surface of the overspray mixture in the collection tank. The overspray mixture from the first outlet 28 is removed by the consolidation tank pump 46 and inputted at an inlet 50 of the consolidation tank 48. Within the consolidation tank 48 micro-bubbles are introduced into the overspray mixture in the consolidation tank 48, which causes some of the polymer float, while some polymer will sink. The consolidation tank 48 includes a surface scraper 52 for collecting floating polymer and creating a second solid rich mixture 53 proximate to the surface of the consolidation tank 48. The surface scraper 52 pushes the second solid rich mixture 53 into a chute 54. The consolidation tank 48 is located on the roof platform 114 so that gravity removes the second solid rich mixture 53 through the chute 54. The polymer that settles to a bottom surface 56 of the consolidation tank 48, forms a third solid rich mixture 58 that is removed using an outlet 60. A return liquid 49 from the consolidation tank 48 leaves through an outlet 51 and is sent back to the collection tank 16 through the port 106.

Figure 10:
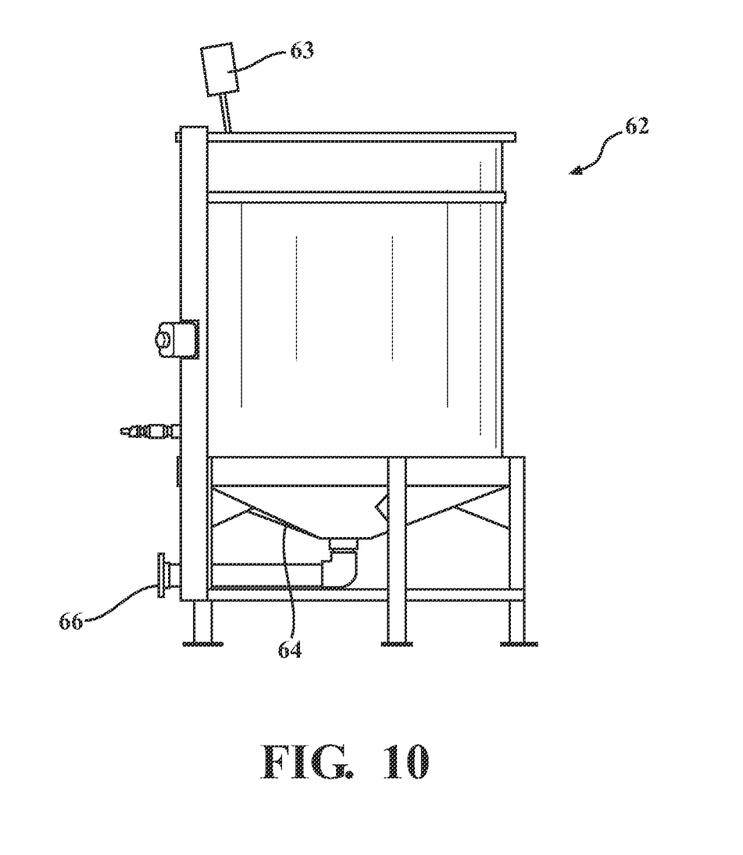
FIG. 10 is a side elevational view of a cone bottom tank.
Figure 11:
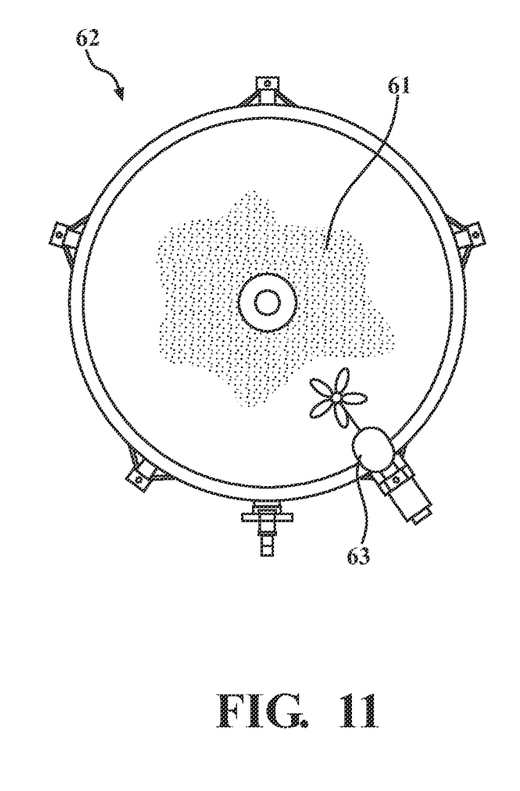
FIG. 11 is a top plan view of the cone bottom tank.

The system 10 further includes a cone bottom tank 62, the details of which are shown in FIGS. 10 and 11, for receiving the first solid rich mixture 38, the second solid rich mixture 53 and the third solid rich mixture 58 which are combined to form a cone tank mixture 61 that contains the polymer and the liquid, where the polymer is in greater concentration than the liquid. The cone bottom tank 62 is located below the roof platform 114, where the first solid rich mixture 38, the second solid rich mixture 53 and the third solid rich mixture 58 are produced. The cone bottom tank 62 has a conical surface 64 leading to an outlet 66. The cone bottom tank 62 also optionally includes a mixer or agitator 63 that mixes the cone tank mixture 61 to prevent the polymer from becoming too solid which can cause a blockage in the outlet 66.

Figure 4:
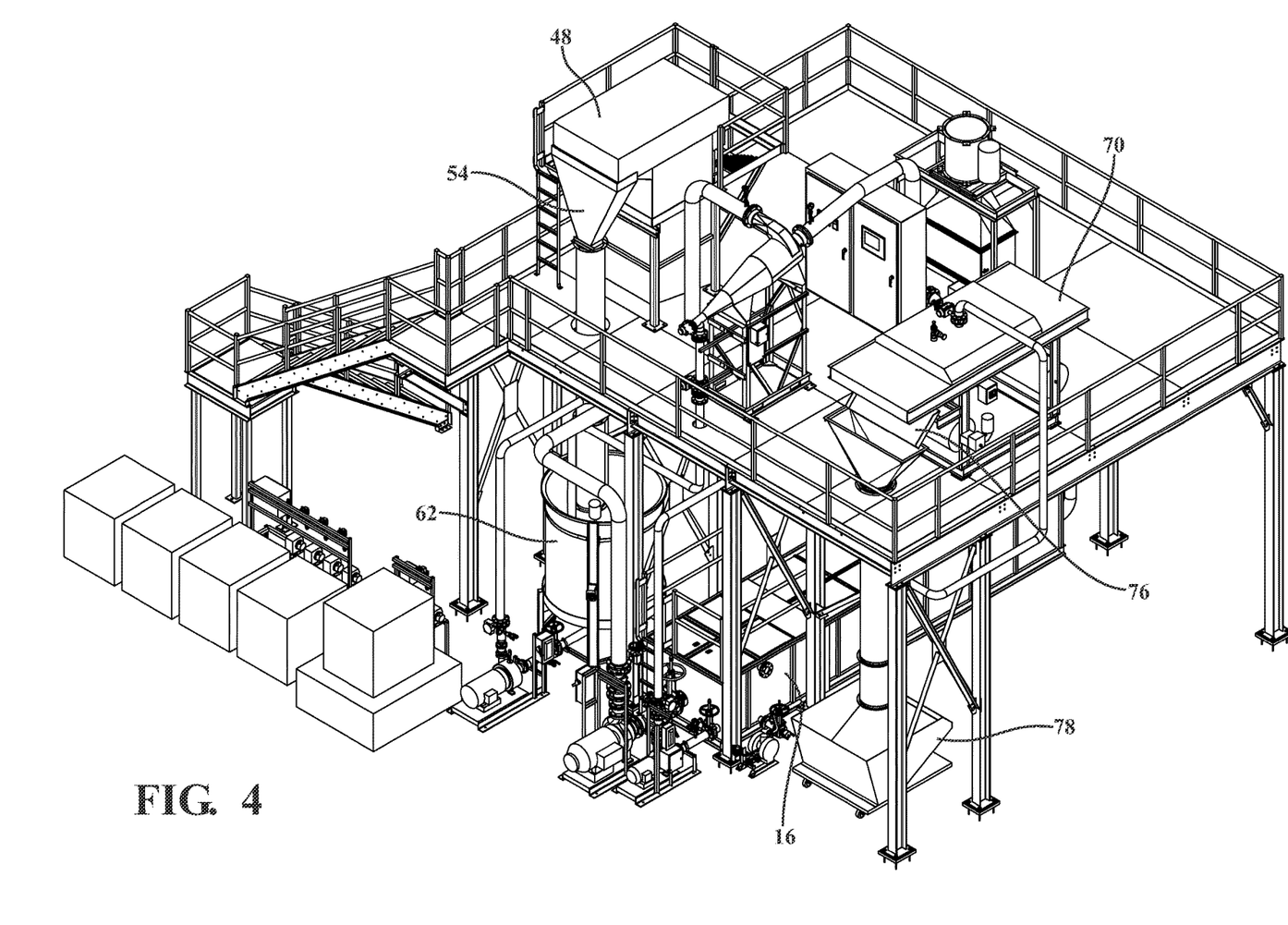
FIG. 4 is a rear side perspective view of a self-contained unit for recovering waste from a pallet coating process.
Figure 5:
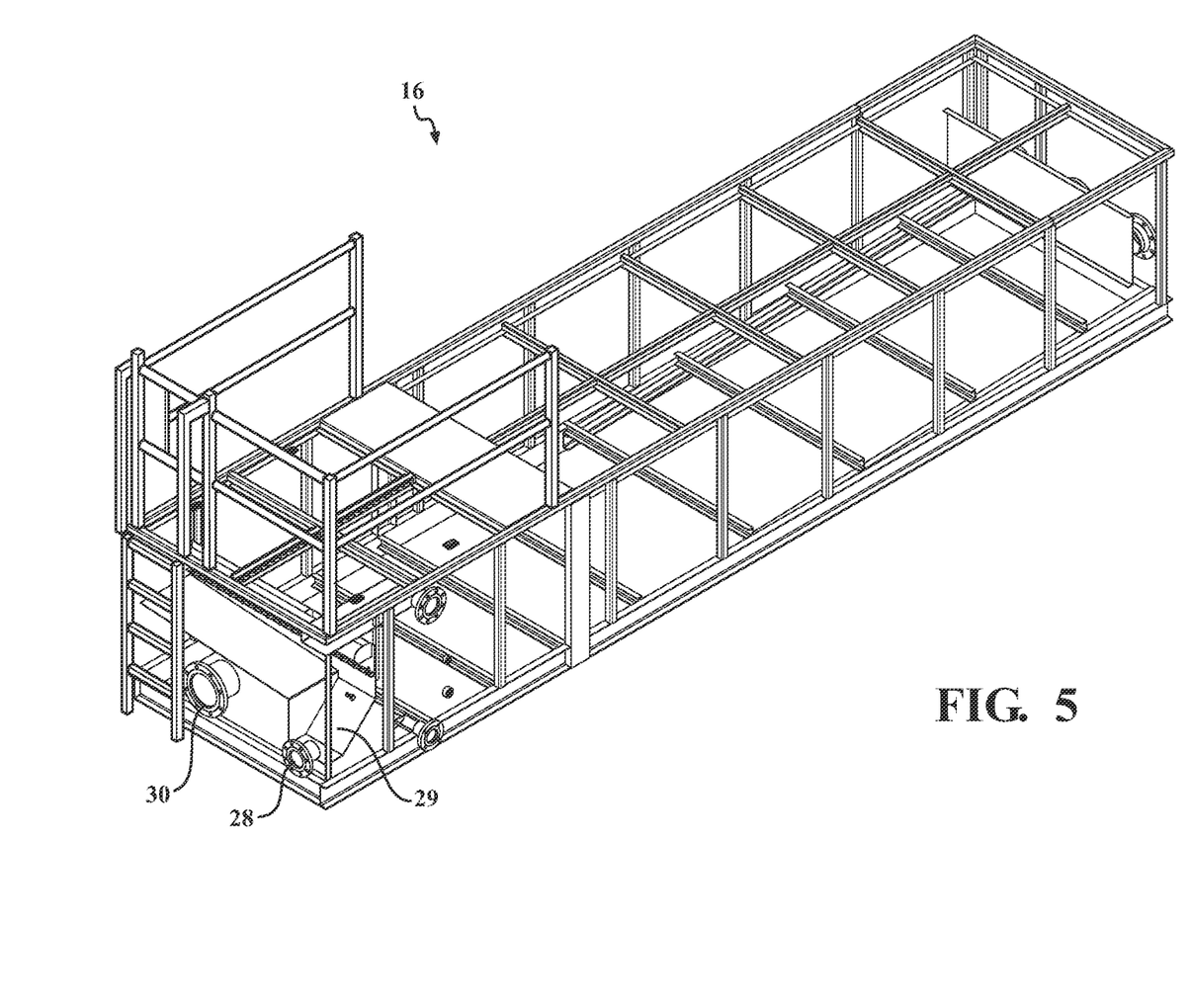
FIG. 5 is a top side perspective view of a collection tank with side walls removed.
Figure 6:
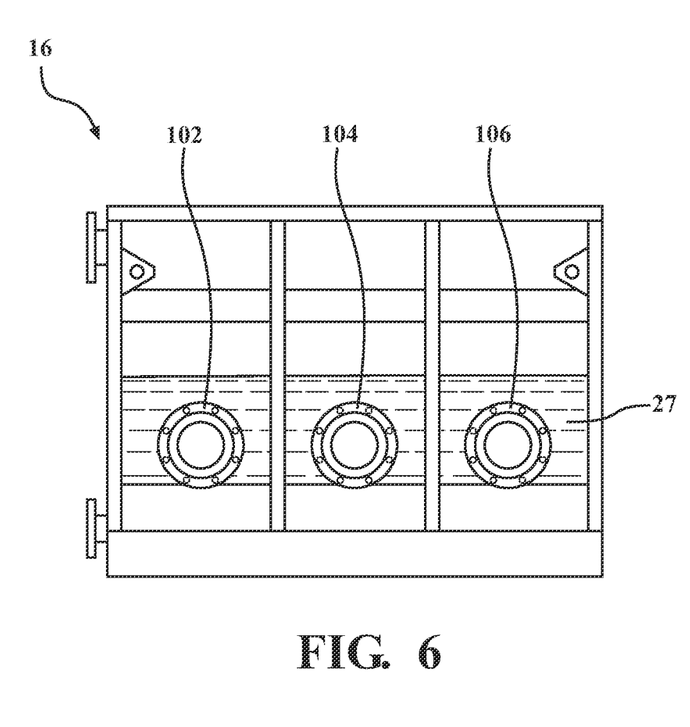
FIG. 6 is a first end elevational view of the collection tank.
Figure 7:
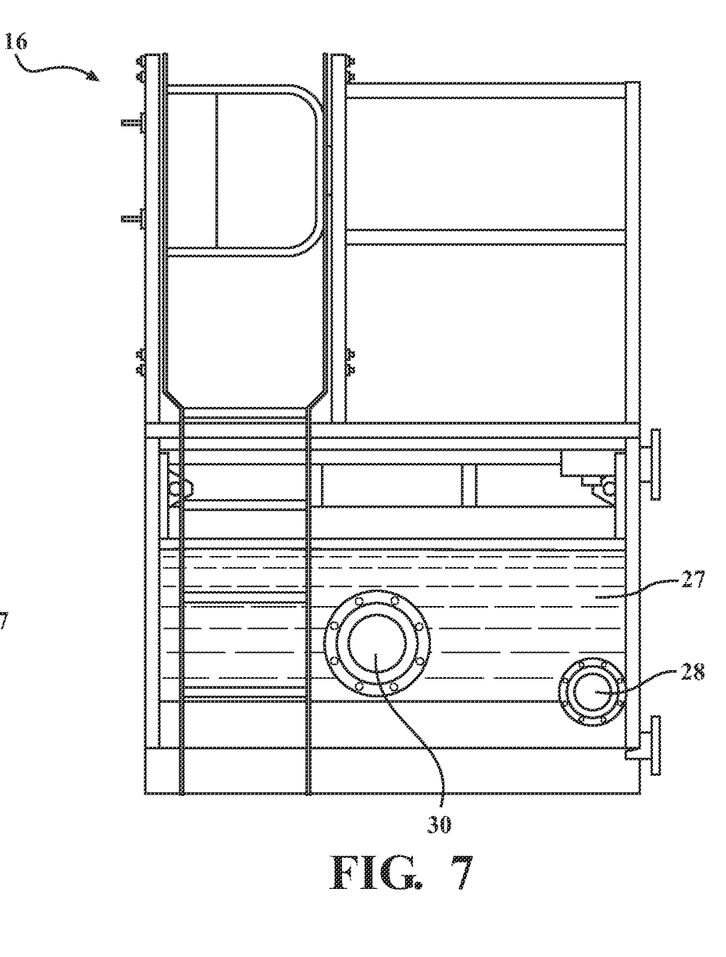
FIG. 7 is a second end elevational view of the collection tank.
Figure 8:
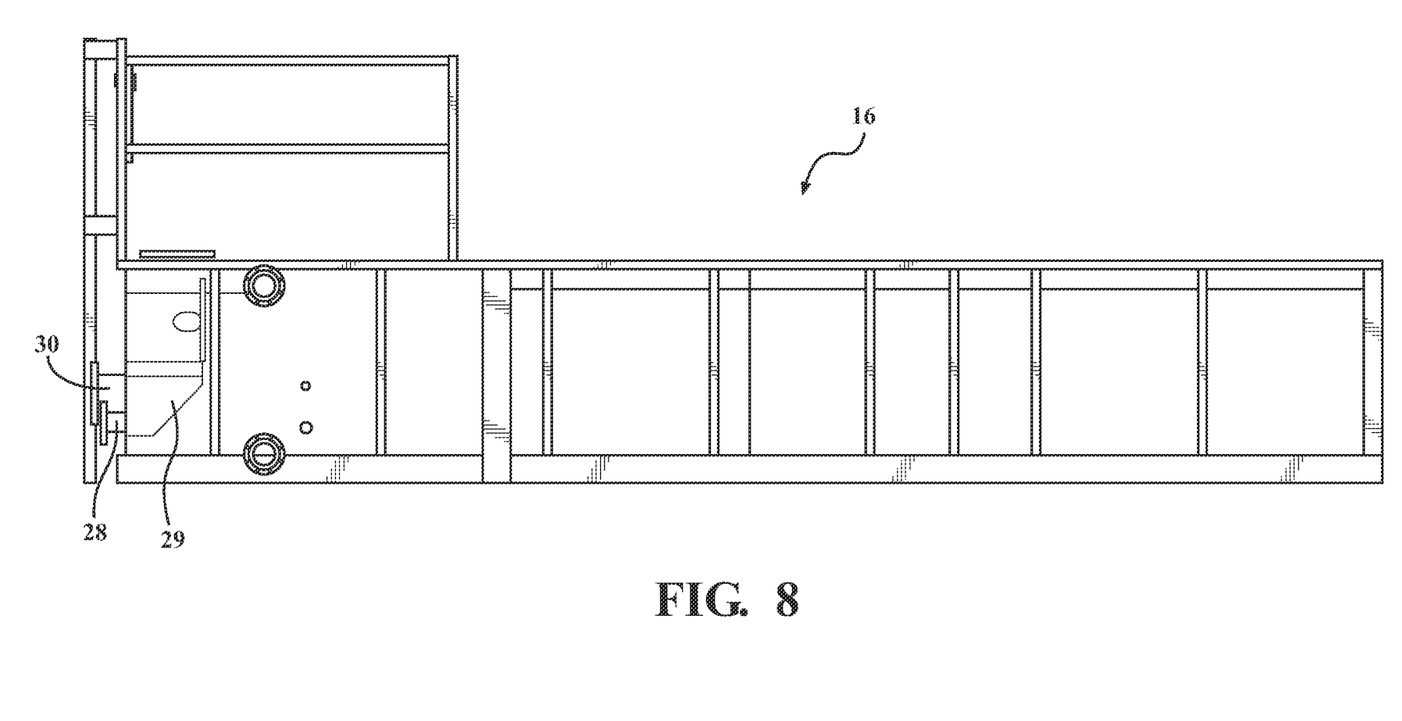
FIG. 8 is a right side elevational view of the collection tank.
Figure 12:
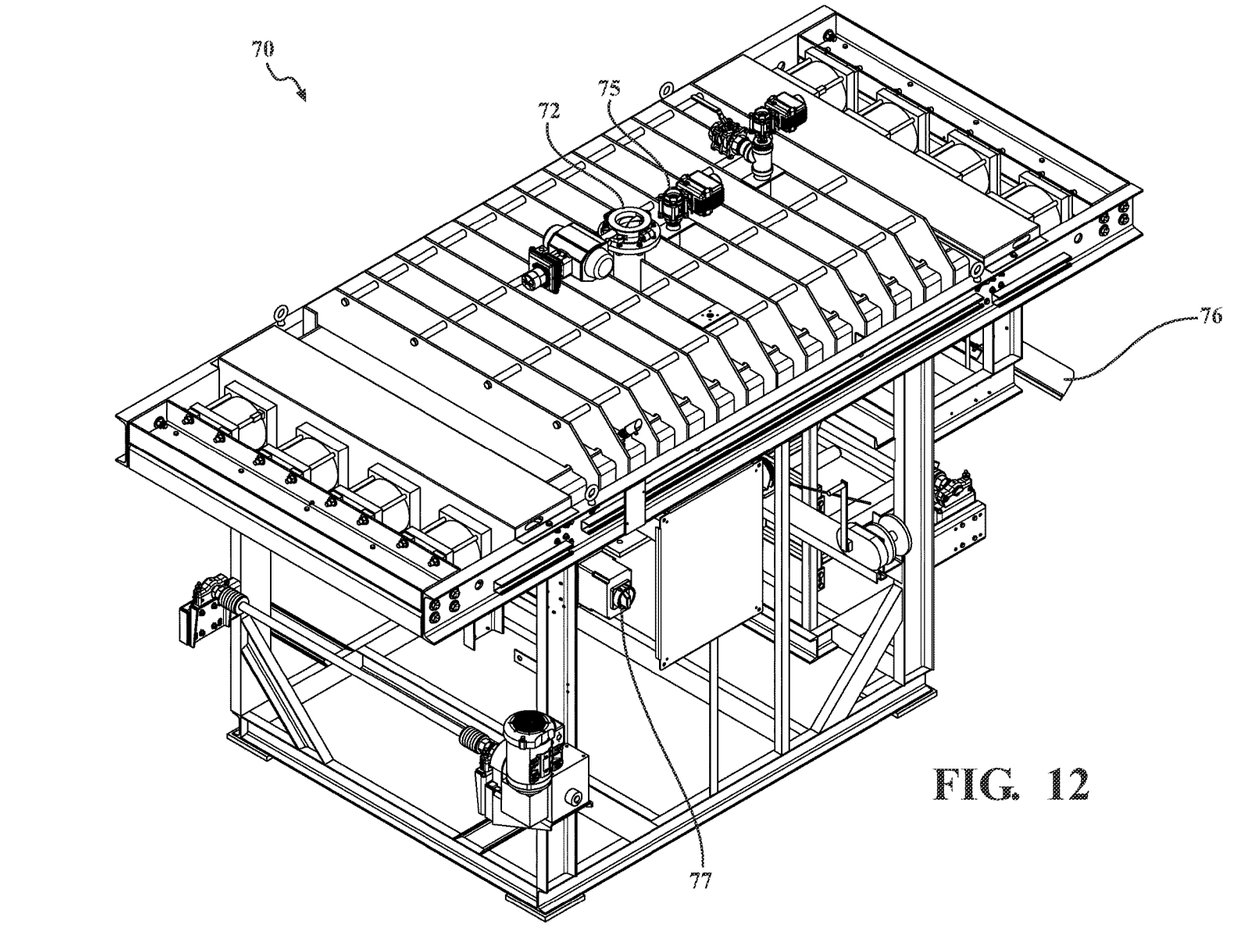
FIG. 12 is a top perspective view of a pressure filter.
Figure 13:
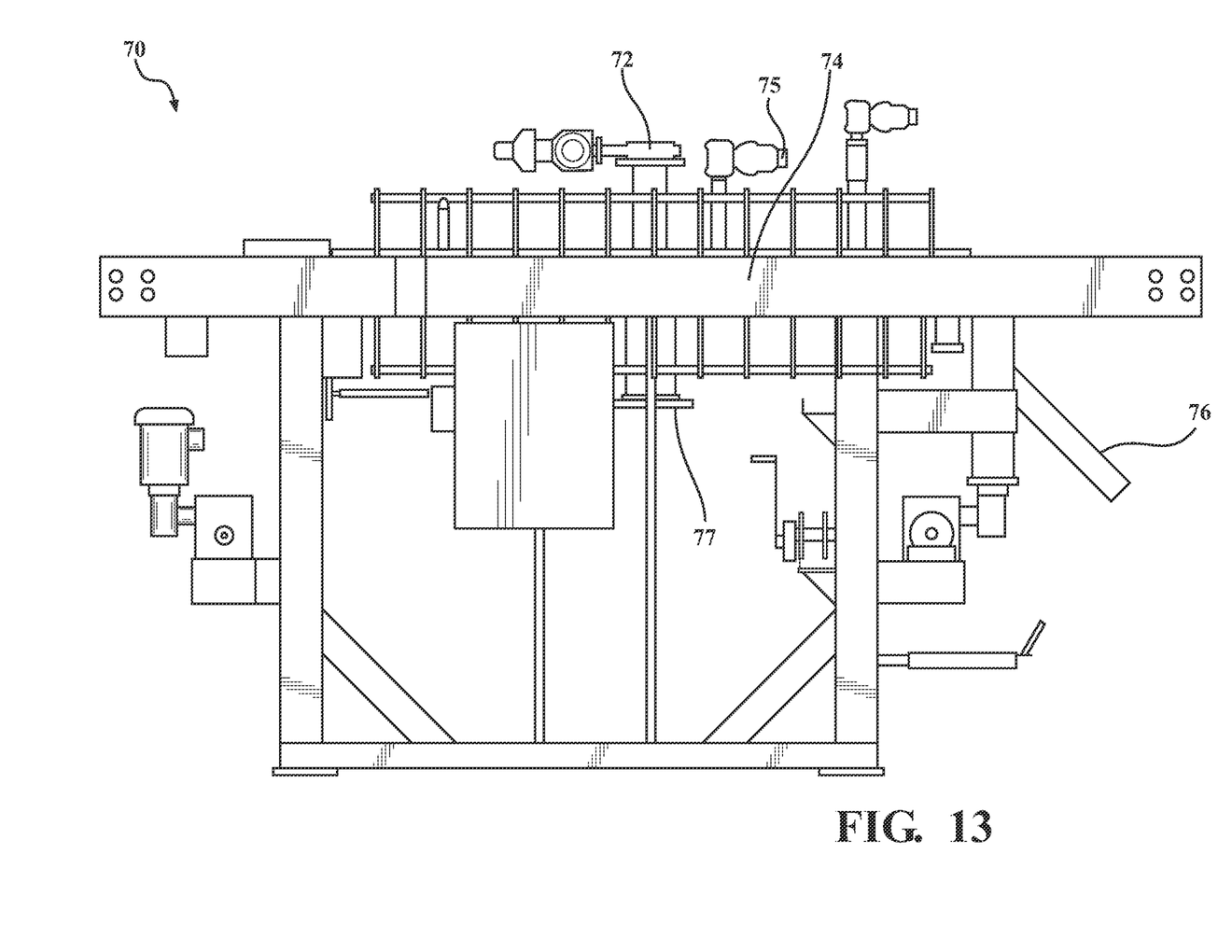
FIG. 13 is a right side elevational view of the pressure filter.

The outlet 66 of the cone bottom tank 62 connects to a pump 68 that pumps the cone tank mixture 61 to the pressure filter 70. Referring also to FIGS. 12 and 13, the pressure filter 70 has an inlet 72 for receiving the cone tank mixture and introducing it to a drying chamber 74 for holding and drying the cone tank mixture. The drying chamber 74 has a screen in combination with a roll of media for capturing polymer from the cone tank mixture as pressurized air from an air inlet 75 is forced through the cone tank mixture to separate the cone tank mixture into a dried polymer solid and return liquid 81. The roll of media in the drying chamber has sections of varying porosity that can be used to capture different sized polymer particles. The liquid is transferred through a liquid outlet 77 of the pressure filter 70 is returned to the collection tank 16 through port 102. The dried polymer in the pressure filter 70 is formed into a dried polymer cake of polymer particles that are removed through a chute 76 and collected in a hopper 78 shown in FIGS. 1 and 4.

Figure 14:
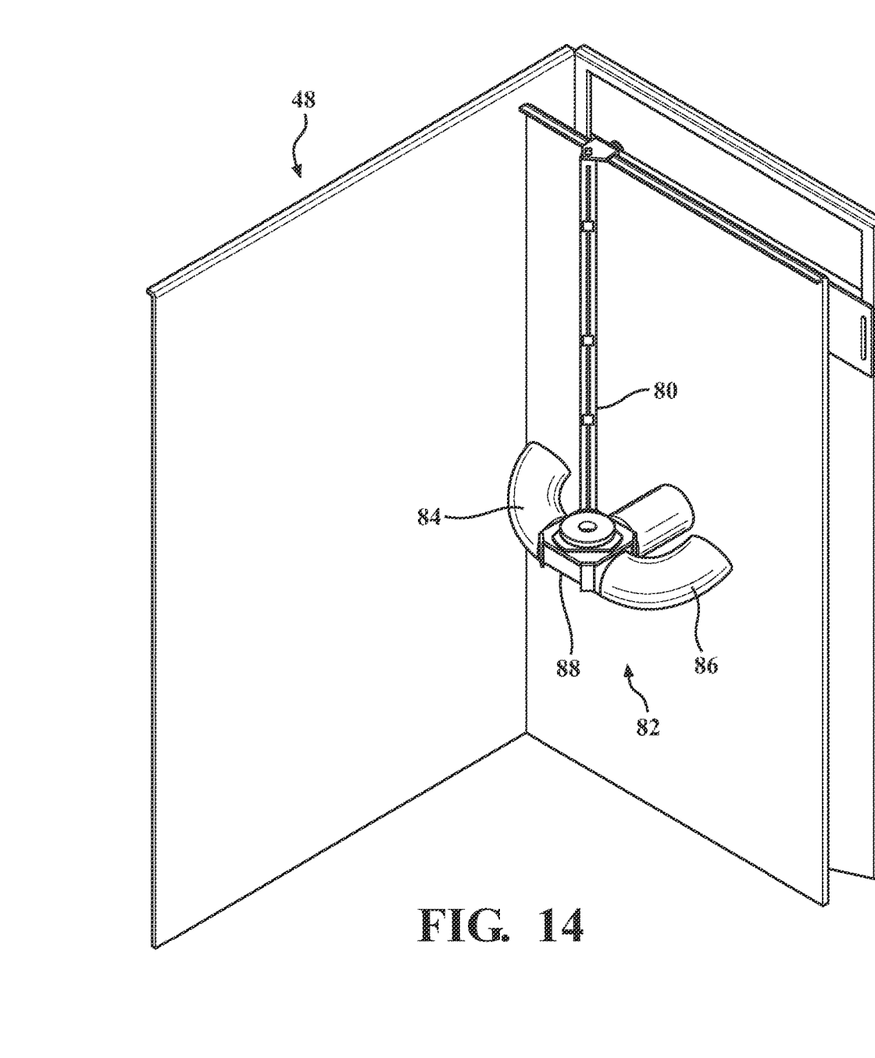
FIG. 14 is a sectional side perspective view of the consolidation tank.
Figure 15:
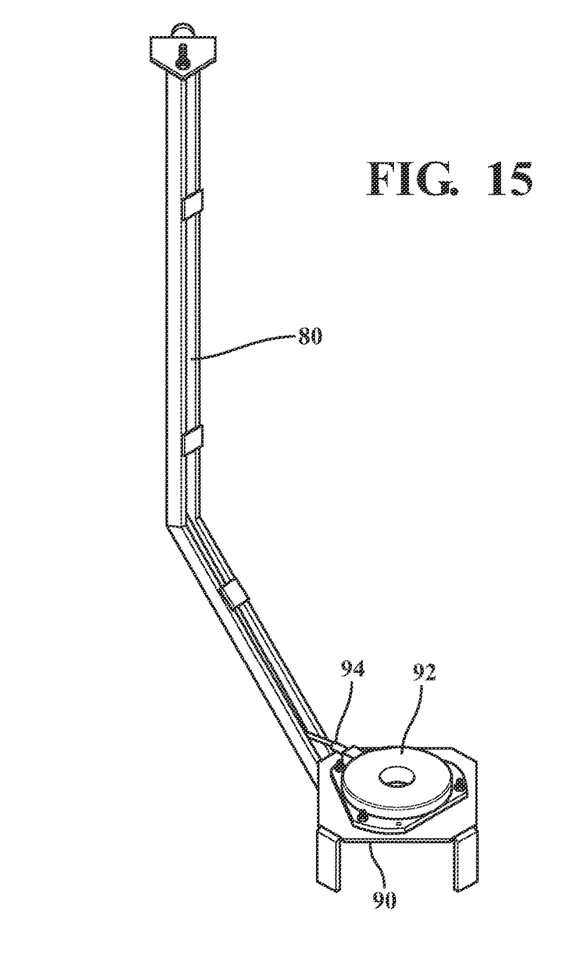
FIG. 15 is a side perspective view of a wand for creating microbubbles in the consolidation tank.

Referring also to FIGS. 9, 14 and 15, another aspect of the invention is now described involving the formation of the micro-bubbles 47 within the consolidation tank 48. The consolidation tank 48 further includes a horn 82 and a removable wand 80 that is placed within the consolidation tank 48. The horn 82 is a shaped tube that connects to the inlet 50. The horn 82 has two outlets 84, 86 that introduce the overspray mixture into the consolidation tank 48, in a turbulent manner to create a current vortex 49 within the consolidation tank 48. The horn 82 also has a seat 88 located between the two outlets 84, 86. The wand 80 has a base 90 that contacts and rests on the seat 88. An air disk 92 is connected to the base 90 and is connected to a compressed air line 94 to received compressed air. When compressed air from the compressed air line 94 is introduced to the air disk 92, air moves through micro-holes in the air disk 92 and create microbubbles in the consolidation tank 48. The microbubbles have an average diameter of 120 micrometers at 1 to 2 bar. The average microbubble diameter is in a range between 50 micrometers to 200 micrometers at 1 to 2 bar. The microbubbles contact the solids in the over spray mixture that is in the consolidation tank 48, which assists in causing the solids to float to the surface. While the consolidation tank 48 is described as being part of the system 10 for removing polymer particles from an overspray mixture for a pallet coating process, it is within the scope of the present embodiment of the invention for the consolidation tank 48 to be used in other systems. It is therefore within the scope of the invention for the consolidation tank 48 to be used in any system where it is desirable to remove solids from a waste mixture and not be limited to being used with a pallet coating process.

Referring now to all the figures, during operation of the system 10 a pallet is inserted through a window 15a, 15b of the self-contained unit 11. Each window 15a, 15b is near a respective one of the workpiece holders 18a, 18b where the pallet is placed. Once in place the window 15a, 15b is closed and the pallet is sprayed by the respective spray applicator 24a 24b to apply a coat of polymer material to one side. Then the pallet is flipped and the other side of the pallet is sprayed by the respective spray applicator 24a, 24b. Once the pallet has been fully sprayed the pallet is transferred out of the self-contained unit 11. Additionally, the system 10 can include an inspection device that is either located within the spray booth or connected the robotic arm that is part of the spray applicator 24a, 24b. The inspection device can be a camera or some other type of sensor. If the inspection device determines that the pallet has not been properly sprayed action can be taken such as moving the pallet to a rejected pallet area or respraying the pallet. The present embodiment of the invention employs two spray booths and two transfer robotic arms so that if one spray booth has to be shut down the other one can continue working. It is within the scope of the invention for additional spray booths and robotic arms to be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A self-contained unit having a system for recovering polymer overspray from a pallet coating process comprising:
   a common enclosure having at least four walls, a ceiling and a floor;
   a collection tank located below the floor of the common enclosure;
   a roof platform located above the ceiling of the common enclosure;

at a plurality of spray booths within the common enclosure having a waterfall wall with liquid flowing down a face of the waterfall wall to the collection tank;

a workpiece holder within a plurality of spray booths for holding a workpiece, wherein the waterfall wall is positioned on a first side of the workpiece holder;

a spray applicator within each of the a plurality of spray booths for spraying a polymer onto a workpiece positioned on the workpiece holder, wherein an overspray of polymer from the spray applicator travels past the workpiece and contacts the liquid of the waterfall wall and is transferred to the collection tank;

a hydrocyclone pump connected to a second outlet of the collection tank;

a hydrocyclone for receiving a portion of the overspray mixture that the hydrocyclone pump moves from the second outlet of the collection tank to an inlet of the hydrocyclone, wherein the hydrocyclone separates the portion of the overspray mixture into a first solid rich mixture that is removed from a first outlet of the hydrocyclone and the liquid that is removed from the second outlet of the hydrocyclone and sent back to an inlet of the waterfall wall;

a consolidation tank pump connected to a first outlet of the collection tank;

a consolidation tank connected to the consolidation tank pump for receiving a portion of the overspray mixture that the consolidation tank pump moves from the second outlet of the collection tank through an inlet of the consolidation tank, wherein a portion of the polymer in the overspray mixture will float to the surface of the consolidation tank creating a second solid rich mixture that is removed from the consolidation tank and a portion of the polymer in the overspray mixture will sink to the bottom of the consolidation tank creating a third solid rich mixture that is removed from the consolidation tank;

a cone bottom tank for receiving the first solid rich mixture, the second solid rich mixture and the third solid rich mixture, that are combined to form a cone tank mixture that contains the polymer and the liquid, where the polymer is in greater concentration than the liquid, wherein the cone bottom tank has an outlet for removing the cone tank mixture; and a pressure filter having an inlet for receiving the cone tank mixture and a drying chamber for holding the cone tank mixture, wherein the drying chamber has a screen with media for capturing polymer in the cone tank mixture as pressurized air is forced through the cone tank mixture to separate the cone tank mixture into a dried polymer cake and a return liquid that is transferred through a liquid outlet of the pressure filter back to the collection tank, wherein the dried polymer cake is removed through a chute to a hopper.

2. The self-contained unit having a system for recovering polymer overspray from a pallet coating process of claim 1 further comprising:

an autoweir for removing overspray mixture which has concentrated polymer material in liquid from the surface of the overspray mixture in the collection tank.

3. The self-contained unit having a system for recovering polymer overspray from a pallet coating process of claim 1, wherein the pressure filter is connected to the roof platform above the common enclosure.

4. The self-contained unit having a system for recovering polymer overspray from a pallet coating process of claim 1 further comprising at least one window through one of the walls of the common enclosure for moving the workpiece in and out of at least one spray booth.

5. The self-contained unit having a system for recovering polymer overspray from a pallet coating process of claim 1 wherein the cone bottom tank is located below the roof platform.

6. The self-contained unit having a system for recovering polymer overspray from a pallet coating process of claim 1 further comprising:

wherein the consolidation tank has a horn connected to the inlet, wherein the horn includes two outlets that introduce a waste mixture into the consolidation tank in a turbulent manner to create a current vortex within the consolidation tank;

a seat formed on the horn between the two outlets;

a wand having a base with an air disk connected to the base, wherein the base connects to the seat of the horn;

a compressed air source connected to the air disk, wherein the air disk creates microbubbles in the consolidation tank that cause solid particles in the waste mixture to float to the surface of the consolidation tank;

a surface scraper collecting solid particles on the surface of the consolidation tank by pushing them to a chute for removal from the consolidation tank; and an outlet at the bottom of the consolidation tank for removing solid particles that sink to the bottom of the consolidation tank.

7. The self-contained unit having a system for recovering polymer overspray from a pallet coating process of claim 6 wherein the microbubbles are less than or equal to 120 micrometers in diameter.

8. The self-contained unit having a system for recovering polymer overspray from a pallet coating process of claim 6 wherein the surface scraper is configured to push the second solid rich mixture into a chute for removal from the consolidation tank.

9. The self-contained unit having a system for recovering polymer overspray from a pallet coating process of claim 1 further comprising:

an outlet of the cone bottom tank; and a pump connected to the outlet of the cone bottom tank that pumps the cone tank mixture to the pressure filter.

10. The consolidation tank of claim 9 wherein the microbubbles are less than or equal to 120 micrometers in diameter.

11. The consolidation tank of claim 9 further comprising an air hose connected to the wand and attached to the air stone for supplying compressed air from the compressed air source to the air disk.

12. The self-contained unit having a system for recovering polymer overspray from a pallet coating process of claim 1, wherein the plurality of spray booths comprises a first spray booth and a second spray booth.

13. The self-contained unit having a system for recovering polymer overspray from a pallet coating process of claim 12, wherein the first spray booth is configured to operate independently of the second spray booth.

14. The self-contained unit having a system for recovering polymer overspray from a pallet coating process of claim 1, wherein the plurality of spray booths comprises three or more spray booths, and wherein the three or more spray booths are configured to operate independently of each other.

15. The self-contained unit having a system for recovering polymer overspray from a pallet coating process of claim 1, wherein the spray applicator comprises a robotic arm with at least one nozzle.

16. The self-contained unit having a system for recovering polymer overspray from a pallet coating process of claim 1, wherein each of the plurality of spray booths comprise a transfer robotic arm configured to transfer a workpiece to and from the common enclosure.

17. The self-contained unit having a system for recovering polymer overspray from a pallet coating process of claim 1, wherein the plurality of spray booths comprises:
- a first spray booth having a first transfer robotic arm configured to transfer a first workpiece to and from the common enclosure; and
- a second spray booth having a second transfer robotic arm configured to transfer a second workpiece to and from the common enclosure,
- wherein the first spray booth and the first transfer robotic arm are configured to operate independently of the second spray booth and the second transfer robotic arm.

* * * * *